United States Patent
Kaneko et al.

(10) Patent No.: US 8,512,544 B2
(45) Date of Patent: Aug. 20, 2013

(54) METAL COLLECTION METHOD AND METAL COLLECTION DEVICE

(75) Inventors: Tatsuo Kaneko, Ishikawa (JP); Maiko Kaneko, Ishikawa (JP); Hiroshi Kawazoe, Tokyo (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 13/145,497

(22) PCT Filed: Jun. 18, 2010

(86) PCT No.: PCT/JP2010/004089
§ 371 (c)(1),
(2), (4) Date: Jul. 20, 2011

(87) PCT Pub. No.: WO2010/146876
PCT Pub. Date: Dec. 23, 2010

(65) Prior Publication Data
US 2011/0272292 A1 Nov. 10, 2011

(30) Foreign Application Priority Data
Jun. 18, 2009 (JP) .................................. 2009-145361

(51) Int. Cl.
*C25C 7/00* (2006.01)
*C25C 1/00* (2006.01)

(52) U.S. Cl.
USPC ........... 205/560; 205/585; 204/233; 536/55.1

(58) Field of Classification Search
None
See application file for complete search history.

(56) References Cited

U.S. PATENT DOCUMENTS

| | | | | |
|---|---|---|---|---|
| 3,681,056 A | * | 8/1972 | Lyon et al. | 75/429 |
| 3,994,789 A | * | 11/1976 | Langer et al. | 205/579 |
| 4,285,799 A | * | 8/1981 | de Nora et al. | 204/290.09 |
| 4,622,344 A | * | 11/1986 | Babcock et al. | 521/28 |
| 4,702,838 A | * | 10/1987 | Babcock et al. | 210/638 |
| 4,857,159 A | * | 8/1989 | Davis et al. | 205/510 |
| 5,470,820 A | * | 11/1995 | Hauser et al. | 505/472 |
| 6,306,276 B1 | * | 10/2001 | Nobe et al. | 205/238 |
| 6,989,102 B1 | | 1/2006 | Park et al. | |
| 7,005,056 B2 | * | 2/2006 | Srinivasan et al. | 205/333 |
| 7,427,345 B2 | | 9/2008 | Saito et al. | |
| 2008/0023321 A1 | * | 1/2008 | Sadoway | 204/243.1 |
| 2009/0266714 A1 | * | 10/2009 | Kaneko et al. | 205/50 |
| 2010/0006801 A1 | | 1/2010 | Kaneko et al. | |

FOREIGN PATENT DOCUMENTS

| | | |
|---|---|---|
| JP | 48-056588 | 8/1973 |
| JP | 1-247584 | 10/1989 |
| JP | 6-212309 | 8/1994 |
| JP | 11-070384 | 3/1999 |
| JP | 2003-164768 | 6/2003 |
| WO | 2008/062574 | 5/2008 |

\* cited by examiner

*Primary Examiner* — Harry D Wilkins, III
(74) *Attorney, Agent, or Firm* — Hamre, Schumann, Mueller & Larson, P.C.

(57) ABSTRACT

The method of the present invention includes a step (i) in which a voltage is applied between first and second electrodes 21 and 22 so that the first electrode serves as a cathode, with the first and second electrodes 21 and 22 being placed in contact with a material that allows ions to move therethrough. The material includes an adsorbent (gel 11) containing a macromolecule that has adsorbed a metal ion. The macromolecule contains the same constitutional units as those contained in a macromolecule extracted from Aphanothece sacrum. The first electrode 21 is placed in contact with the adsorbent in step (i). The metal is deposited on a surface of the first electrode 21 by applying the voltage in step (i).

7 Claims, 8 Drawing Sheets

METAL COLLECTION METHOD AND METAL COLLECTION DEVICE

TECHNICAL FIELD

The present invention relates to metal collection methods and metal collection devices.

BACKGROUND ART

Since reserves of metals such as rare metals are limited, it is important to recycle resources effectively. Furthermore, toxic metals such as heavy metals should be collected from waste fluids discharged from factories etc.

A method using algae has been proposed as a method for adsorbing metal ions in a solution. For example, a method for adsorbing ions of rare earth elements using chlorella etc. has been proposed (JP H6-212309 A). Furthermore, it has been reported that a macromolecule extracted from Aphanothece sacrum, which is a freshwater cyanobacterium, adsorbs metal ions (International publication No. WO 2008/062574).

CITATION LIST

Patent Literature

[PTL 1] JP 6-212309 A
[PTL 2] International publication No. WO 2008/062574 A1

SUMMARY OF INVENTION

Technical Problem

However, the above-mentioned patent literatures do not disclose any method for collecting the adsorbed metals. It is therefore required to find a method for collecting the adsorbed metals in order to reuse the metals effectively.

Solution to Problem

With the foregoing background in mind, it is an object of the present invention to provide a new method and a device for collecting a metal from the adsorbent that has adsorbed an metal ion.

As a result of research for achieving the above object, the present inventors found that metals dissolving in a solution can be efficiently collected using a gel of SACRAN. The present invention is based on this new finding.

The metal collection method of the present invention includes (i) applying a voltage between first and second electrodes so that the first electrode serves as a cathode, with the first and second electrodes being placed in contact with a material that allows ions to move therethrough, wherein the material includes an adsorbent containing a macromolecule that has adsorbed an ion of a metal, the macromolecule contains the same constitutional units as those contained in a macromolecule extracted from Aphanothece sacrum, the first electrode is placed in contact with the adsorbent in step (i), and the metal is deposited on a surface of the first electrode by applying the voltage in step (i).

The metal collection device of the present invention includes: an adsorbent containing a macromolecule that is capable of adsorbing an ion of a metal; and first and second electrodes, wherein the first electrode can be placed in contact with the adsorbent, and the macromolecule contains the same constitutional units as those contained in a macromolecule extracted from Aphanothece sacrum.

Advantageous Effects of Invention

The present invention makes it easy to collect metals dissolving in a solution.

DESCRIPTION OF EMBODIMENTS

Embodiments of the present invention are described below. The present invention is not limited to the following embodiments and examples. In the following description, specific numerical values and specific materials may be shown by way of example. However, other numerical values or other materials may be used as long as the advantageous effect of the present invention can be achieved.

[Metal Collection Method]

The method of the present invention for collecting a metal includes a step of (i) applying a voltage between the first and second electrodes so that the first electrode serves as a cathode (negative electrode), with the first and second electrodes being placed in contact with a material that allows ions to move therethrough. The material that allows ions to move therethrough includes an adsorbent containing a macromolecule that has adsorbed an ion of a metal. In step (i), the first electrode is placed in contact with the adsorbent. The metal is deposited on the surface of the first electrode by the voltage application in step (i).

Hereinafter, the material that allows ions to move therethrough and that used in step (i) may be referred to as "material (I)," and the macromolecule in the adsorbent may be referred to as "macromolecule (P)." Hereinafter, the metal that is collected using the method of the present invention may be referred to as "metal (M)," and an ion (cation) of the metal (M) may be referred to as "metal ion (MI)."

In a typical state in which the electrode is in contact with the material (I), the electrode is placed in the material (I). In a typical state in which the electrode is in contact with the adsorbent, the electrode is placed in the adsorbent. In a typical example of the present invention, the first electrode is placed in the adsorbent and the second electrode is placed in the material (I).

Since the metal ion (MI) is reduced at the surface of the first electrode (which serves as a cathode) by the voltage application in step (i), the metal (M) is deposited on the surface of the first electrode. On the other hand, generation of hydrogen ion and oxygen gas due to electrolysis of water and/or adsorption/oxidation of anions occur at the surface of the second electrode (which serves as an anode).

The method of the present invention makes it possible to collect the metal ion (MI) adsorbed on the adsorbent. The metal ion (MI) in a solution can be collected by bringing the adsorbent into contact with a solution containing the metal ion (MI) so as to cause the metal ion (MI) to be adsorbed by the adsorbent, and then collecting the adsorbed metal ion (MI).

In the method of the present invention, it is possible to collect specific metal elements selectively by using a macromolecule (P) whose adsorption efficiency changes depending on the kind of the metal ion (MI). For example, SACRAN mentioned below has a tendency to adsorb trivalent metal ions selectively, and especially has a tendency to adsorb trivalent metal ions of rare earth elements (e.g., neodymium, dysprosium, gadolinium, cerium, europium, etc.).

The metal (M) is not particularly limited. Examples of the metal (M) include alkali metal elements, alkali earth metal elements, transition metal elements (which include rare earth elements), metal elements of Group 12, metal elements of Group 13, and metal elements of Group 14. Because reserves of the rare earth metal elements are small, it is particularly important to collect and reuse them.

The material (I) may be composed only of the adsorbent and may be composed of the adsorbent and other materials (e.g., electrolyte). In step (i), the second electrode may be placed in contact with the adsorbent, or may be placed in contact with the material (I) other than the adsorbent. However, both the first and second electrodes are placed in contact with the material (I), which is continuous so as to allow ions to move therethrough. In another aspect, the first and second electrodes are in contact with the material (I) so that electrolysis occurs between them. At least the first electrode is placed in contact with the adsorbent. In one example, the adsorbent is placed in contact with an electrolyte, the first electrode is placed in contact with the adsorbent, and the second electrode is placed in contact with the electrolyte. Examples of electrolytes include aqueous solutions in which arbitrary ions (e.g., the metal ion (MI) etc.) are dissolved.

In general, a direct current voltage is applied between the first electrode and the second electrode in step (i). The magnitude of the applied voltage is not limited and is determined depending on the types of the electrodes and the metal (M). For example, the applied voltage may be in the range of 1 volt to 50 volts.

[Adsorbent]

The macromolecule (P) included in the adsorbent contains a functional group that can adsorb the metal ion (MI). The macromolecule (P) may contain a first functional group and a second functional group that adsorbs water molecule more easily than the first functional group does and that adsorbs the metal ion (MI) less easily than the first functional group does. For example, the macromolecule (P) may contain the first functional group that adsorbs the metal ion (MI) more easily than water molecules and contain the second functional group that adsorbs water molecules more easily than metal ion (MI). Here, the meaning of "adsorbing a water molecule" includes the adsorption of the oxonium ion ($H_3O^+$), which contains a water molecule. Examples of the first functional group include a carboxyl group and examples of the second functional group include a sulfuric acid group and a sulfonic group although they depend on the kind of the metal (M). When the macromolecule (P) containing the first functional group and the second functional group is used, the first functional group adsorbs the metal ion (MI) and the second functional group adsorbs water. Consequently, the macromolecule (P) maintains its swollen state even after adsorbing the metal ion (MI). That is, the state that allows electrolysis is maintained even after the macromolecule (P) has adsorbed the metal ion (MI).

The macromolecule (P) may be a macromolecule (e.g., polysaccharide) that contains sulfated muramic acid mentioned below as a constitutional unit. Furthermore, the macromolecule (P) may be a macromolecule (e.g., polysaccharide) that contains uronic acid mentioned below and sulfated muramic acid. An example of the ratio of them is the same as the ratio of them in SACRAN mentioned below.

There is no limitation in the molecular weight of the macromolecule (P) as long as an advantageous effect of the present invention can be achieved. For example, the weight average molecular weight of the macromolecule (P) may be in the range of 10,000 to 20 million.

A preferred example of the macromolecule (P) is a macromolecule containing the same constitutional units as those contained in the macromolecule extracted from Aphanothece sacrum. For example, the macromolecule (P) may be a polysaccharide that contains, as its constitutional units, monosaccharides such as 6-deoxy sugar (and/or pentose), uronic acid, hexopyranose, and sulfated muramic acid. An example of such macromolecule (P) is a macromolecule extracted from Aphanothece sacrum. Hereinafter, the macromolecule extracted from Aphanothece sacrum may be referred to as "SACRAN." An example of the methods for extracting SACRAN from Aphanothece sacrum is disclosed in the international publication No. WO 2008/062574 A1.

In one example, SACRAN can be extracted from Aphanothece sacrum by putting Aphanothece sacrum into a 0.1N—NaOH aqueous solution of 80° C., and stirring it for several hours. In another example, SACRAN can be extracted from Aphanothece sacrum by heating a water dispersion of Aphanothece sacrum for 30 minutes at 135° C. in an autoclave. The extracted SACRAN may be refined using centrifugal separation, filtration, alcohol washing, etc. Steps of freezing and dissolving Aphanothece sacrum, and then removing pigment may be performed before extracting SACRAN from Aphanothece sacrum.

Figure 1:
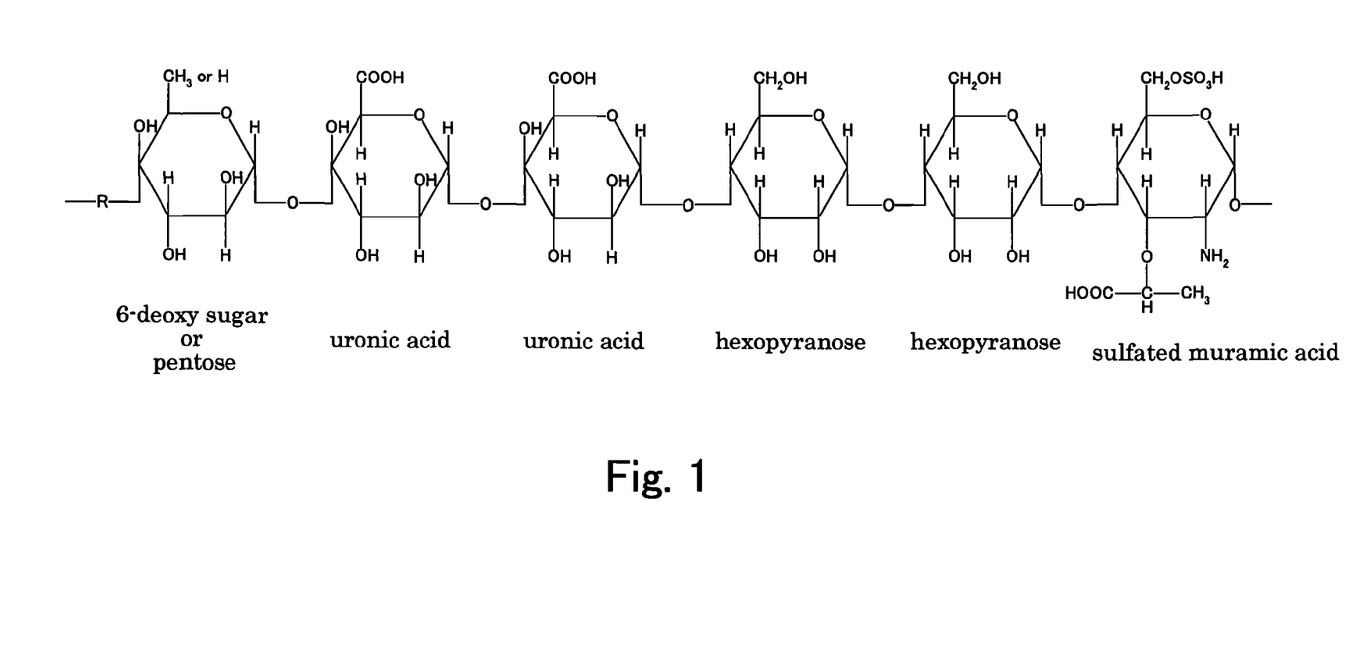
FIG. 1 shows part of a structure of an example of SACRAN.

SACRAN is a polysaccharide that contains, as its constitutional units, monosaccharides such as 6-deoxy sugar (and/or pentose), uronic acid, hexopyranose, and sulfated muramic acid. An example in which they are connected is shown in FIG. 1. The arrangement of the constitutional units (monosaccharides) in FIG. 1 is shown by way of example, and the arrangement of the constitutional units is not limited to the arrangement in FIG. 1.

The ratio and average molecular weight of the monosaccharides that constitute SACRAN varies depending on the time and place of collecting Aphanothece sacrum. In one example of SACRAN, the percentage of sulfated muramic acid in all the constitutional units is in the range of 1 mol % to 30 mol %, and the percentage of uronic acid in all the constitutional units is in the range of 1 mol % to 50 mol %. The weight average molecular weight of one example of SACRAN is in the range of 10,000 to 20 million.

The adsorbent used in step (i) may be a gel (hydrogel: hydrophilic gel) containing the macromolecule (P). Examples of such gel include a gel produced by crosslinking the macromolecules (P) and include a gel produced by dispersing the macromolecule (P) in other gels. Two examples of the methods for producing the gel using SACRAN are described below.

In the first example of the method for producing the gel, the gel is produced by crosslinking the functional groups (e.g., carboxyl groups, hydroxyl groups, etc.) contained in SACRAN. For example, a gel can be produced by a method in which a compound that crosslinks the functional groups is added to the aqueous solution of SACRAN. Examples of compounds that crosslink the carboxyl groups include diamines (e.g., L-(D-) lysine, cadaverine, spermine, adipoyldihydrazide) and diepoxy compounds (e.g., polyethylene glycol diglycidyl ether). Examples of compounds that crosslink the hydroxyl groups include divinyl compounds such as divinylsulfone.

In the second example of the method for producing the gel, SACRAN is placed inside a gel formed of materials other than SACRAN. Examples of the gel produced by the second method include a gel having a semi-interpenetrating macromolecule network (semi-IPN) structure. Examples of gels in which SACRAN is placed include a hydrogel produced by crosslinking polyvinyl alcohol.

The adsorbent may be an adsorbent produced by having the macromolecule (P) supported by a support. The adsorbent may be an adsorbent produced by making a support react with a part of the functional groups of the macromolecule (P). Examples of supports include fine particles (e.g., silica gel, polystyrene fine particles, acrylic fine particles, melamine resin fine particles). When the macromolecule (P) is a macromolecule (e.g., SACRAN) containing a carboxyl group, the support containing, on its surface, a group (e.g., amino group) that reacts with the carboxyl group may be used.

The adsorbent used in step (i) may include an ion-permeable membrane and the macromolecule (P) that is held by the ion-permeable membrane. The ion-permeable membrane allows the metal ion (MI) to pass therethrough while preventing the macromolecule (P) from passing therethrough. As the ion-permeable membrane, a membrane that allows ions to pass therethrough while preventing macromolecules with a molecular weight of 500 or more from passing therethrough can be used, for example. Examples of such ion-permeable membrane include a cellophane film. Furthermore, microfiltration membranes and ultrafiltration membranes can be used as the ion-permeable membrane. Examples of such filtration membranes include organic films such as polyvinylidene fluoride (PVDF), polyacrylonitrile (PAN), polyolefin, and polyvinyl alcohol; and inorganic films such as silica, zeolite, alumina, and carbon. These membranes can be selected in accordance with the conditions, such as their objects, characteristics, life span, and cost.

An example of the adsorbent using the ion-permeable membrane is produced by placing the macromolecule (P) inside a bag formed of the ion-permeable membrane. The macromolecule (P) placed inside the ion-permeable membrane may be a gel or gel-like.

In another aspect, the adsorbent used in the present invention may be an adsorbent characterized by macromolecule (P) not diffusing into the electrolyte when the adsorbent is put in the electrolyte. For example, the adsorbent may be a solidified one. In still another aspect, the adsorbent of the present invention may be a swollen adsorbent that does not diffuse into the electrolyte when the adsorbent is put in the electrolyte.

[First and Second Electrodes]

The first and second electrodes are not particularly limited as long as an advantageous effect of the present invention is achieved. Electrodes that are formed of a conductive material and that do not elute during voltage application can be used as the first and second electrodes. Examples of the conductive material include metals and carbon materials (e.g., graphite and activated carbon). The first electrode and the second electrode may be the same or different. Electrodes made of carbon materials may be used as the first electrode, on which the metal (M) is deposited. Electrodes at which water is easily electrolyzed (for example, a platinum electrode or metal electrodes coated with platinum) may be used as the second electrode. In the method of the present invention, a plurality of the first electrodes may be used and a plurality of the second electrodes may be used. The shape of the first and second electrode can be selected in accordance with the design of the device, and may be a rod-like shape, a plate-like shape, a cylindrical shape, or a mesh shape. In the method of the present invention, plate-like first and second electrodes may be arranged alternately to face each other.

After step (i), an example of the method of the present invention further may include step (ii) of separating the first electrode (on which the metal (M) has been deposited) from the adsorbent, and then collecting the metal (M) from the surface of the first electrode. For example, the deposited metal (M) may be physically scraped from the first electrode to collect the metal (M). Alternately, the metal (M) deposited on the surface of the first electrode may be collected using a method such as electrolytic refining.

In one example of the method of the present invention, step (i) may include the following step (i-a) and step (i-b). In step (i-a), a solution containing the metal ion (MI) (hereinafter may be referred to as "solution (S)") and the adsorbent containing the macromolecule (P) are brought into contact with each other. The solution (S) is, for example, an aqueous solution containing the metal ion (MI). The metal ion (MI) is adsorbed by the macromolecule (P) in step (i-a). In general, the concentration of the metal ion (MI) in the adsorbent is higher than the concentration of the metal ion (MI) in the solution (S). Accordingly, step (i-a) can be regarded as a step of condensing the metal ion (MI) by bringing the adsorbent and the solution (S) into contact with each other. That is, the quantity of the metal ion (MI) in a unit volume can be increased with step (i-a).

In step (i-b), a voltage is applied between the first and second electrodes so that the first electrode serves as a cathode in a state in which the first electrode is placed in contact with the adsorbent that has been subjected to step (i-a) and in which the second electrode is placed in contact with the material (I). By this voltage application, the metal (M) is deposited on the surface of the first electrode. Step (i-b) may be performed in a state in which the adsorbent is in contact with the solution (S) or in a state in which the adsorbent is not in contact with the solution (S).

The adsorbent may be a cartridge-type adsorbent. For example, a column filled with the adsorbent can be used. The metal (M) can be collected efficiently by replacing the cartridge with a new one when the macromolecule (P) in the adsorbent contained in the cartridge adsorbs a certain amount of the metal ion (MI). Step (i) performed with the adsorbent in the cartridge that has replaced the old one can deposit the metal (M) on the surface of the first electrode. The cartridges each may, but need not, include an electrode.

In one example of the present invention, the adsorbent may be in contact with the solution (S) containing the metal ion (MI) in step (i). In step (i), the metal ion adsorbed by the macromolecule (P) is reduced, and the metal ion (MI) in the solution (S) diffuses into the adsorbent to be adsorbed by the macromolecule (P). The metal ion (MI) adsorbed by the macromolecule (P) is reduced by the voltage application. Thus, the metal ion (MI) in the solution (S) is deposited on the surface of the first electrode.

In step (i) in one example of the method of the present invention, the third and fourth electrodes, in addition to the first and second electrodes, may be placed in contact with the adsorbent. The third and the fourth electrodes are placed so that a line drawn to connect them will intersect a line drawn to connect the first electrode and the second electrode. In one example, the electrodes are placed so that a line drawn to connect the third electrode and the fourth electrodes and a line drawn to connect the first electrode and the second electrode will intersect orthogonally at about their centers. In step (i), an alternating current voltage may be applied between the third electrode and the fourth electrode. By applying an alternating current voltage between the third electrode and the fourth electrode, the ions of metal elements of relatively large atomic weight (i.e., metal elements that are not easy to move) selectively gather around the midway of the third electrode and the fourth electrode. The ions of the metal elements that have gathered in this way are deposited on the first electrode, and thereby the metal elements of relatively large atomic weight can be collected selectively. For example, it is possible to collect rare earth elements and heavy metals selectively.

[Metal Collection Device]

The metal collection device of the present invention is a device for collecting the metal ion (MI) in the solution (S). With this metal collection device, the metal collection method of the present invention can be performed easily. The explanations about the metal collection method of the present invention can be applied to the metal collection device of the present invention, and the explanations about the metal collection device of the present invention can be applied to the metal collection method of the present invention.

The metal collection device of the present invention includes first and second electrodes and an adsorbent containing the macromolecule (P) that is capable of adsorbing metal ions. The first electrode can be placed in contact with the adsorbent. The adsorbent, the macromolecule (P), and the first and second electrodes are described above, and thus the repetitive explanations are omitted. The adsorbent may be held by a holder. As long as the advantageous effect of the present invention can be achieved, the holder is not limited and may be a container made of resin in which through-holes are formed or may be a mesh-like holder made of resin.

The device of the present invention does not necessarily need a container for holding the material (I). For example, the metal ion (MI) in the solution (S) can be collected with the steps of immersing the adsorbent (in which the first electrode is placed) and the second electrode in the solution (S) containing the metal ion (MI), and applying a voltage.

However, the device of the present invention further may include a container in which the material (I) is placed; the material (I) contains the adsorbent and allows ions to move therethrough. The second electrode can be placed in contact with the material (I). In this case, the device of the present invention may include a flow path through which the solution (S) containing the metal ion (MI) flows, and the flow path is connected to the above-mentioned container so that the solution (S) comes into contact with the adsorbent. This embodiment makes it possible to collect continuously the metal ion in the solution (S) that flows through the flow path.

The device of the present invention may include a power supply for applying a direct current voltage between the first electrode and the second electrode. The power supply may be an AC-DC converter that changes AC power from electrical outlets into DC power, or may be other power supplies.

The device of the present invention may include a controller for controlling the voltage application. An example of such a controller includes a memory in which a program for performing the above-mentioned steps is stored and a processing unit for executing the program to control the device.

The device of the present invention may include the third and fourth electrodes between which an alternating current voltage is applied. In that case, the device of the present invention may include a power supply for applying the alternating current voltage.

In the device of the present invention, the container in which the adsorbent is placed may be a replaceable cartridge-type container. In another aspect, the present invention relates to the metal collection system using a cartridge containing the adsorbent and the collection device for collecting the metal ion (MI) adsorbed by the macromolecule (P) in the cartridge. The collection device includes the first and second electrodes and the power supply, which are mentioned above.

Hereinafter, the method and device of the present invention are described by way of example with reference to the drawings. In the following description, the same numerals may be used for the same members, and the same description thereof is not repeated in some cases. In the drawings mentioned below, the metal ions (MI) of any valence is referred to as "$M^+$", and the anions of any valence is referred to as "$A^-$."

[Embodiment 1]

Figure 2A:
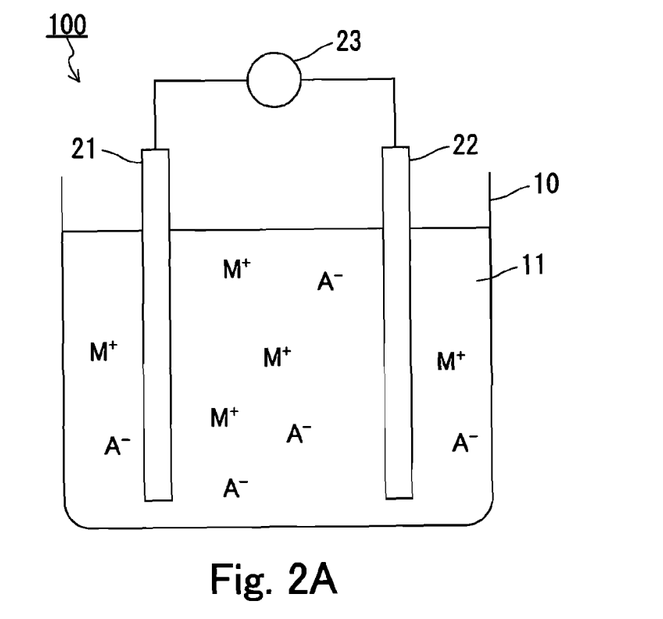
FIG. 2A schematically shows an example of the device of the present invention.
Figure 2B:
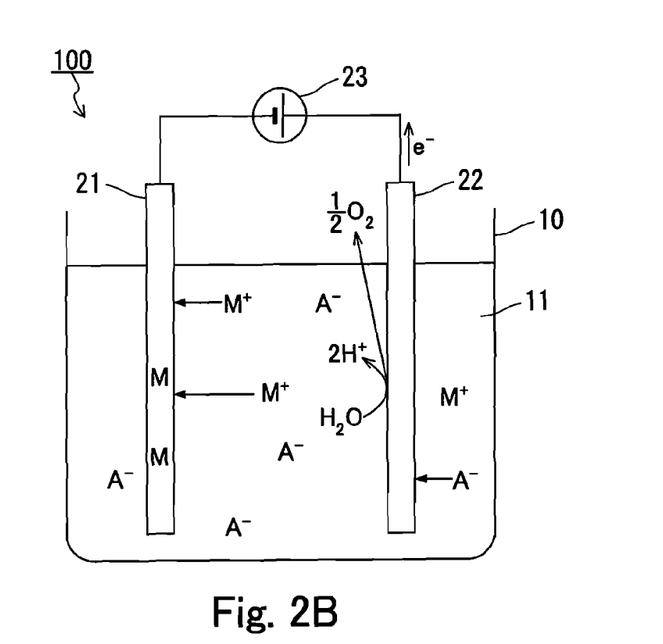
FIG. 2B shows an operating state of the device shown in FIG. 2A.

FIG. 2A shows a device 100 of Embodiment 1. Hatching is omitted in FIG. 2A and FIG. 2B. The device 100 includes a container 10, SACRAN gel (adsorbent) 11, first electrodes 21, second electrodes 22, and a power supply 23. The gel 11 is placed in the container 10. FIG. 2A and FIG. 2B show only one first electrode 21 among the first electrodes 21 and show only one second electrode 22 among the second electrodes 22. The first electrodes 21 and the second electrodes 22 are placed in the gel 11. The first electrodes 21 and the second electrodes 22 can be taken out of the gel 11. The first electrodes 21 and the second electrodes 22 are connected to the power supply 23. The SACRAN gel 11 has adsorbed a metal ion.

A voltage is applied between the first electrodes 21 and the second electrodes 22 with the power supply 23 so that the first electrodes 21 serve as a cathode (negative electrode). As a result, as shown in FIG. 2B, the metal ion ($M^+$) adsorbed by SACRAN is reduced to be metal (M), which is deposited on the surface of the first electrodes 21. On the other hand, oxygen gas and hydrogen ion are generated at the second electrodes 22 that serve as an anode (positive electrode). The first electrodes 21 on which the metal (M) has been deposited is taken out of the gel 11, and then the metal (M) is collected.

The gel 11 from which the metal (M) has been collected may be brought into contact with a solution in which a metal ion is dissolved, so that the gel 11 can adsorb the metal ion again. A larger quantity of metal (M) can be collected by repeating the adsorption of the metal ion and the collection of the metal (M) with the voltage application by turns.

[Embodiment 2]

Figure 2C:
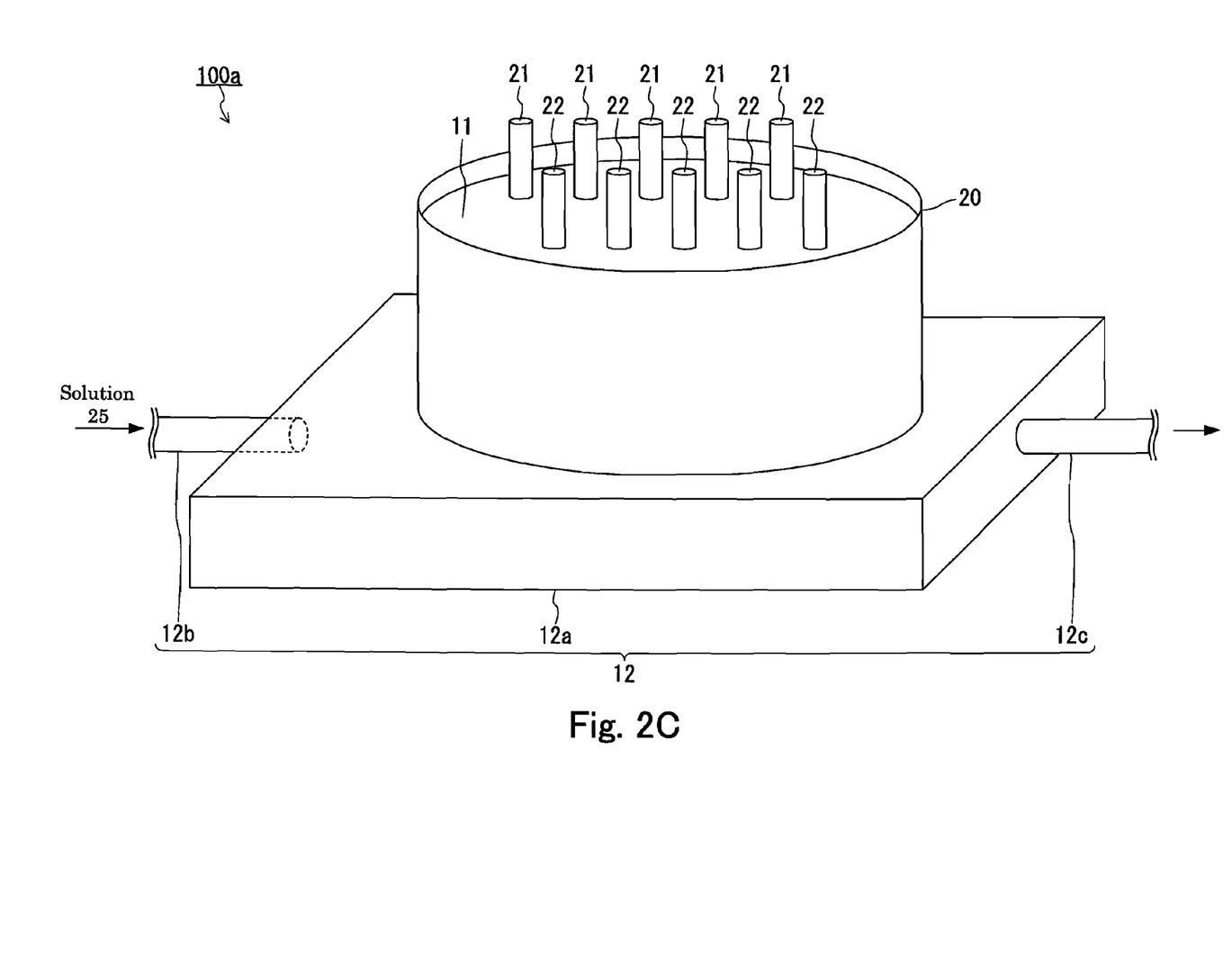
FIG. 2C schematically shows another example of the device of the present invention.

In Embodiment 2, a method and a device for collecting a metal ion continuously are described. FIG. 2C shows a device 100a of Embodiment 2.

The device 100a in FIG. 2C includes a container 20, the SACRAN gel 11, a flow path 12, the first electrodes 21, the second electrodes 22, and a power supply (not shown). The upper part of the container 20 is open, and a plurality of through-holes (not shown) are formed in the bottom thereof. The gel 11 is held in the container 20. The flow path 12 includes a vessel 12a, an inlet path 12b and an outlet path 12c; these paths are connected to the vessel 12a. The solution 25 in which the metal ion (MI) is dissolved is sent to the vessel 12a from the inlet path 12b, and then is discharged from the outlet path 12c.

The bottom of the container 20 is in contact with the vessel 12a. The solution 25 that flows through the vessel 12a can permeate into the container 20 via the through-holes formed in the bottom of the container 20. The first electrodes 21 and the second electrodes 22 are placed in the gel 11. The first electrodes 21 can be taken out of the gel 11. The first electrodes 21 and the second electrodes 22 are connected to the power supply.

The metal collection method using the device 100a is described below. The solution 25 containing the metal ion (MI) is sent to the vessel 12a from the inlet path 12b. Part of the solution 25 permeates into the container 20 and the metal ion in the solution 25 in the vessel 12a diffuses into the gel 11 in the container 20, thereby the metal ion (MI) is adsorbed by the gel 11. As a result, the metal ion (MI) is held by the gel 11, being more concentrated than that in the solution 25.

A direct current voltage is applied between the first electrodes 21 and the second electrodes 22 with the power supply so that the first electrodes 21 serve as a cathode. As a result, the metal (M) is deposited on the surface of the first electrodes 21 as in the case of FIG. 2B. The first electrodes 21 each are taken out of the gel 11 in turn, and the metal (M) deposited on the surface thereof is collected. The first electrode 21 from which the metal (M) has been collected is returned in the gel 11. This embodiment makes it possible to collect the metal (M) continuously from the solution 25. The solution 25 in which the concentration of the metal ion (MI) has decreased is discharged from the outlet path 12c. The solution 25 discharged from the outlet path 12c may be sent to the vessel 12a again via the inlet path 12b. This embodiment makes it possible to collect a larger quantity of the metal (M) from the solution 25.

[Embodiment 3]

Figure 3:
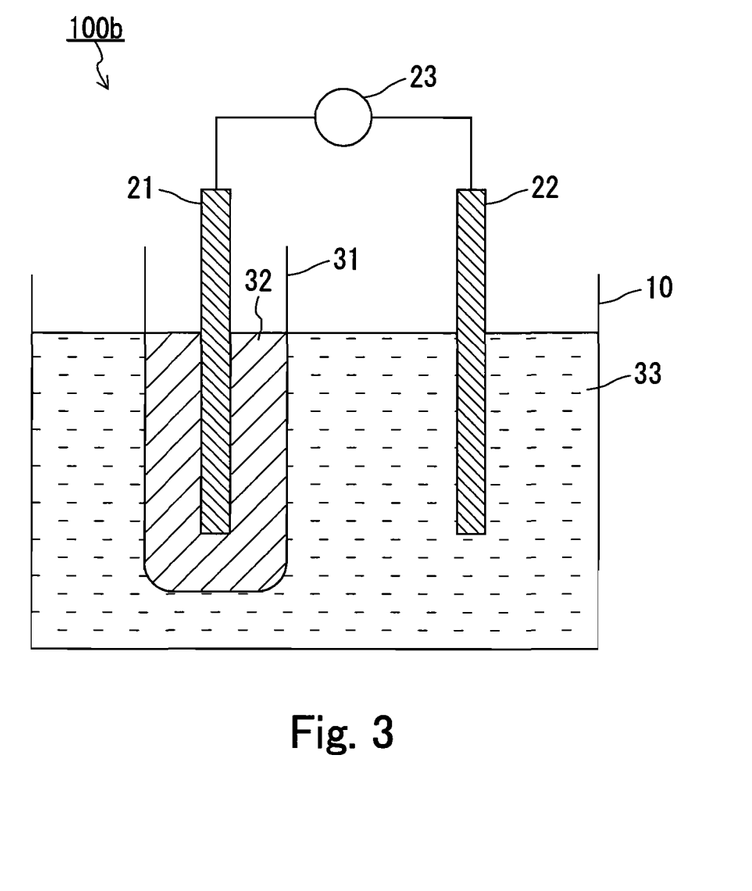
FIG. 3 schematically shows still another example of the device of the present invention.

In Embodiment 3, a method and a device using an ion-permeable membrane are described. FIG. 3 shows the device of Embodiment 3.

A device 100b shown in FIG. 3 includes the container 10, an ion-permeable membrane 31, an adsorbent 32 containing SACRAN, an electrolyte 33, the first electrode 21, the second electrode 22, and the power supply 23. The electrolyte 33 is placed in the container 10. The ion-permeable membrane 31 is placed in the electrolyte 33. The adsorbent 32 is placed in the ion-permeable membrane 31. The adsorbent 32 and the electrolyte 33 constitute the material (I) that allows ions to move therethrough. The first electrode 21 is placed in the adsorbent 32. The second electrode 22 is placed in the electrolyte 33. A voltage is applied between the first electrode 21 and the second electrode 22 so that the first electrode 21 serves as a cathode in a state in which the adsorbent 32 has adsorbed the metal ion (MI). Thereby the Metal (M) is deposited on the surface of the first electrode.

EXAMPLES

Hereinafter, the present invention will be described in detail with reference to examples.

[Extraction of SACRAN]

An example in which SACRAN was extracted from Aphanothece sacrum is described below. First, Aphanothece sacrum was frozen, and then melted. With this treatment, water-soluble pigment was eluted from the cell of Aphanothece sacrum, and was removed by water washing. Next, Aphanothece sacrum was washed with acetone to remove fat-soluble pigment (chlorophyll etc.).

Next, Aphanothece sacrum after washing was put in an 80° C. 0.1N—NaOH aqueous solution, which was stirred for 5 hours. Thus, the polysaccharide (SACRAN) contained in Aphanothece sacrum was eluted. Next, impurities were removed by filtering the NaOH aqueous solution with gauze. The filtered NaOH aqueous solution was neutralized with HCl to have a pH of about 7-8.

Next, the neutralized aqueous solution was added to a mixed solvent of acetone and water (acetone:water=70:30 in volume ratio), and was stirred, and thereby SACRAN was collected and refined. Thus obtained SACRAN was dissolved in water to prepare an aqueous solution thereof, and the aqueous solution was added to acetone to be dehydrated. Thus, fibrous SACRAN was produced. The yield was in the range of 50 to 80 wt % of the dry weight of the raw material.

[Structure Analysis of SACRAN]

The produced SACRAN was analyzed with methods such as ultraviolet-visible spectrum measurement, photoelectron spectrometry (XPS), infrared absorption spectrum measurement, FT-ICR mass analysis (FT-ICR-MS), and gas chromatography mass spectrometry (GS-MS). The results showed that (1) its weight average molecular weight was about 16 million, and (2) it contained a plurality of monosaccharides as its constitutional units. Examples of the monosaccharides that constituted SACRAN included 6-deoxy sugar (and/or pentose), uronic acid, hexopyranose, and sulfated muramic acid. More specifically, the sugar residues obtained by multistep hydrolysis of SACRAN were glucose, mannose, galactose, fucose, glucuronic acid, galacturonic acid, rhamnose, xylose, galactosamine, N-acetylmuramic acid, and arabinose. Functional groups, such as a sulfuric acid group, a carboxyl group and an amino group, are bonded to part of these sugar residues in SACRAN.

The ratio of the monosaccharides that constitute SACRAN varies depending on when and where Aphanothece sacrum is collected. In one example of SACRAN, the carboxyl group is bonded to 22 mol % of all the sugar residues and the sulfuric acid group is bonded to 10 mol % of all the sugar residues.

It is believed that SACRAN contains the carboxyl group and the sulfuric acid group and that the carboxyl group preferentially adsorbs the metal ions. In some cases, macromolecules that contain only a carboxyl group as a hydrophilic group cannot maintain its hydrated state when the carboxyl group adsorbs a metal ion. However, SACRAN contains a sulfuric acid group in addition to the carboxyl group, and therefore maintains a highly hydrated state even when the carboxyl group adsorbs a metal ion. Accordingly, electrolysis can be performed in the hydrogel of SACRAN even in a state in which a metal ion is adsorbed by SACRAN.

[Hydrogel of SACRAN]

A hydrogel was produced by crosslinking the carboxyl groups in SACRAN using diamine. First, an aqueous solution of SACRAN (concentration: 1 wt %) was prepared. Next, L-lysine in an amount of 10 mol % relative to SACRAN was added to the aqueous solution of SACRAN. Next, the aqueous solution of SACRAN was deaerated using a centrifuge.

Figure 4:
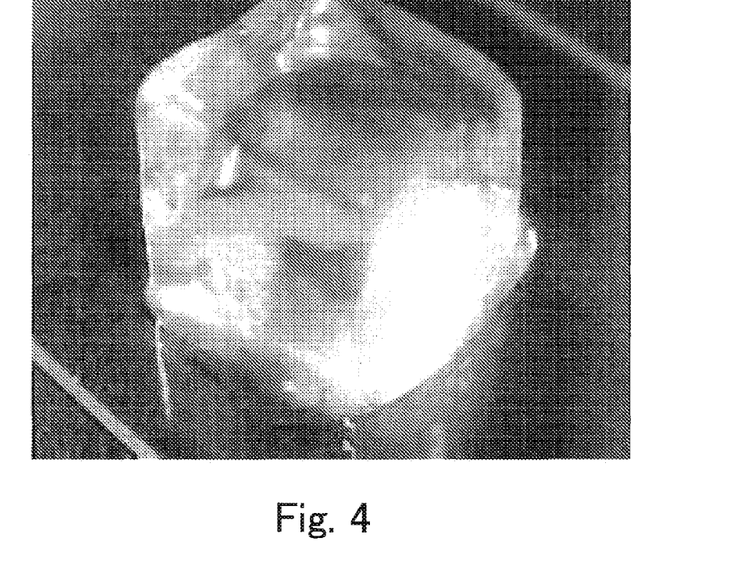
FIG. 4 is a photograph of a hydro-gel of SACRAN.

Next, water-soluble carbodiimide in an amount of three times the weight of SACRAN was added to the aqueous solution of SACRAN. Next, the aqueous solution of SACRAN was deaerated using a centrifuge. Then, the aqueous solution was allowed to stand for three days at 4° C. to allow the reaction to progress. Next, the resultant reaction product was immersed in distilled water for four days. Thus, a hydrogel using SACRAN was produced. FIG. 4 shows a photograph of the produced hydrogel.

The hydrogel of SACRAN was subjected to experiments to examine its capability to adsorb metal ions. First, five aqueous solutions of metal ions, which were different in concentration, were prepared. The metal ions were gadolinium ion ($Gd^{3+}$) or indium ion ($In^{3+}$). The concentration of the aqueous solutions of the metal ions was set to $10^{-3}$ M (mol/L), $2.5 \times 10^{-3}$ M, $5.0 \times 10^{-3}$ M, or $10^{-2}$ M.

Figure 5:
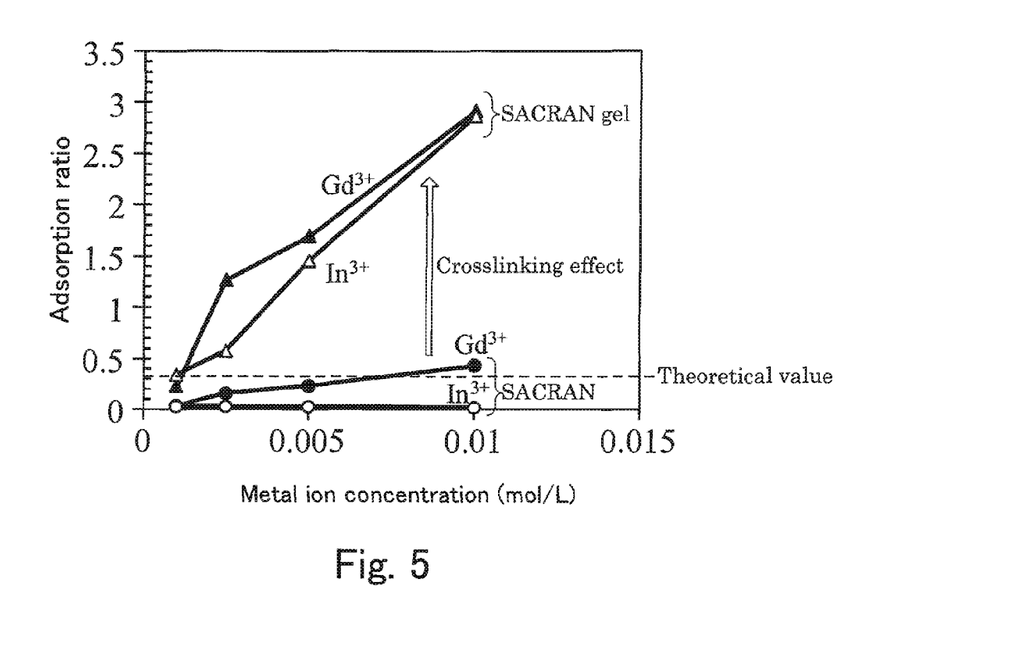
FIG. 5 is a graph showing the adsorption ratio of metal ions with regard to SACRAN and a crosslinked gel of SACRAN.

Next, the hydrogel (volume: 1 $cm^3$) of SACRAN was immersed in 10 ml of the aqueous solution of the metal ion, which was allowed to stand until the adsorption of the metal ion reached equilibrium (specifically, for five days). Then, the supernatant liquid was extracted from the aqueous solution of the metal ion to measure the metal ion concentration in the supernatant liquid using an ICP optical emission spectrometry. The quantity of the metal ion adsorbed by the hydrogel of SACRAN was calculated using the measurement result. Furthermore, SACRAN that was not gelled was examined for comparison. Specifically, SACRAN that was not gelled, which was the same amount as SACRAN contained in the hydrogel of SACRAN, was immersed in the aqueous solution of the metal ion, and the quantity of the metal ion adsorbed by SACRAN was calculated. FIG. 5 shows the measurement results.

The adsorption ratio in the vertical axis in FIG. 5 shows the number of the adsorbed metal ion with respect to the number of the sulfuric acid group contained in SACRAN. When the sulfuric acid group and the metal ion are assumed to be bonded completely, three sulfuric acid groups adsorb one metal ion because the metal ion is trivalent. In that case, the adsorption ratio should be 0.33. However, in the hydrogel, the adsorption ratio was much higher than 0.33 in the region where the concentration of the metal ion was high. Compared to SACRAN that was not gelled, the gelled SACRAN achieved an extremely high adsorption ratio of the metal ion. A comparison of gadolinium ion and indium ion showed that the adsorption ratio of the ion of gadolinium, which is a rare earth element, was likely to be high. These results demonstrated that the metal ions (especially, ions of the rare earth elements) can be collected with high efficiency using the gelled SACRAN.

[Collection of Metal Ions]

A hydrogel of SACRAN was produced by the method mentioned above. The hydrogel (1 $cm^3$) was immersed in 10 ml of an aqueous solution (concentration: $10^{-2}$ M) of the neodymium ion ($Nd^{3+}$) for five days at room temperature. Thus, the hydrogel that had adsorbed the neodymium ion was produced.

Figure 6:
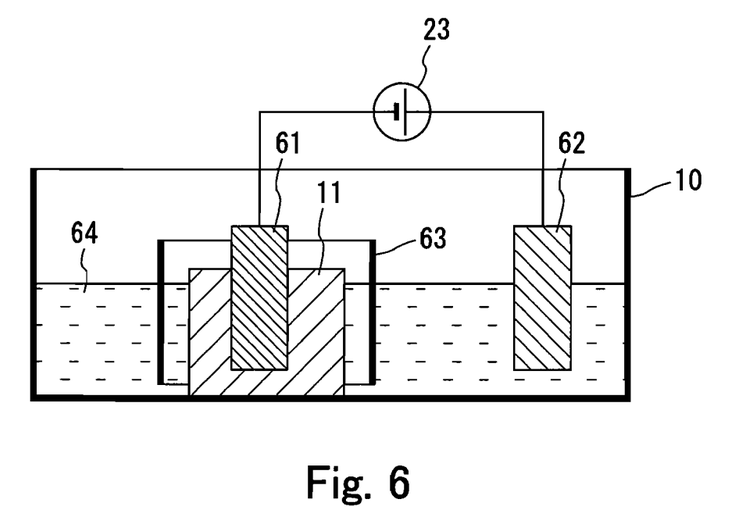
FIG. 6 schematically shows an experiment of collecting metals conducted in Examples.

Next, neodymium ion was collected from the hydrogel using the device shown in FIG. 6. The device shown in FIG. 6 included the container 10, the power supply 23, a carbon rod 61 (the first electrode), a platinum electrode 62 (the second electrode), and a pipe 63 (the holder). Pure water 64 was put inside the container 10. There was a gap between the container 10 and the lower part of the pipe 63, and therefore ions could move between the hydrogel inside the pipe 63 and the pure water 64 outside the pipe 63.

A voltage of 10 volts was applied between the carbon rod 61 and the platinum electrode 62 so that the carbon rod 61 serves as a cathode (negative electrode). This 10 volts voltage application was continued for one week at room temperature. As a result, a white material was deposited on the surface of the carbon rod 61. The hydrogel swelled along with deposition of the white material.

Figure 7:
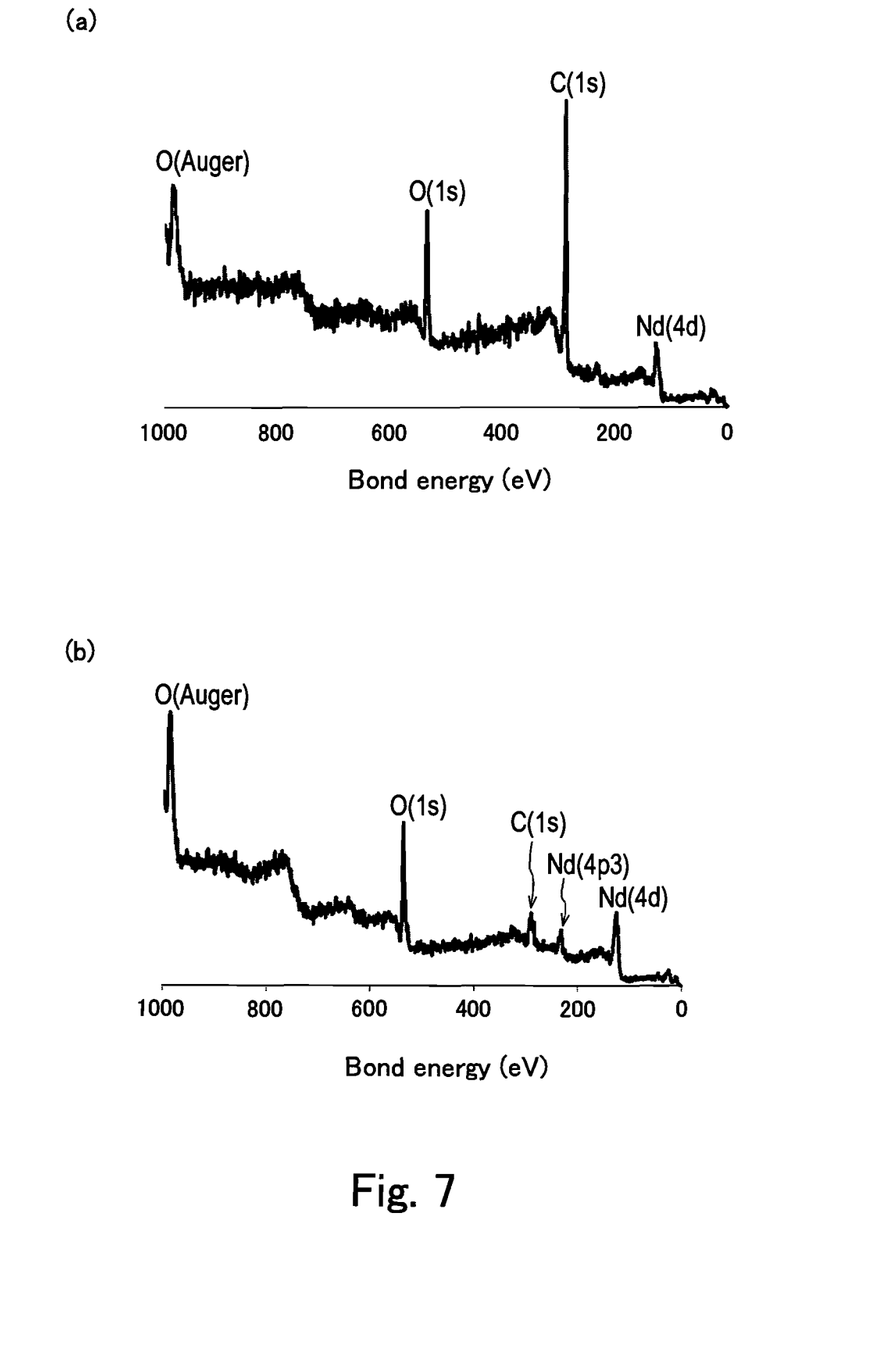
FIG. 7 shows XPS spectra of the cathode, and (a) shows a part with a small quantity of deposit and (b) shows a part with a large quantity of deposit.

In order to analyze the deposited material, the part with little white material and the part with much white material (these parts each were a part of the carbon rod) were subjected to photoelectron spectrometry (XPS). FIG. 7 (*a*) and FIG. 7 (*b*) show the measurement results. FIG. 7 (*a*) shows the result about the part with little white material, and FIG. 7 (*b*) shows the result about the part with much white material. The results shown in FIGS. 7 (*a*) and (*b*) demonstrated that the white material was neodymium. It is believed that the reason why the hydrogel swelled along with the deposition of neodymium is that the carboxyl group that had adsorbed neodymium ion was hydrated along with the release of the neodymium ion.

[Semi-IPN Gel of SACRAN]

A semi-IPN gel in which SACRAN was put inside a hydrogel made of other material was produced ("IPN" means "interpenetrating polymer network"). First, 10 ml of a 5 wt % aqueous solution of polyvinyl alcohol and 10 ml of a 1 wt % aqueous solution of SACRAN were mixed. Glutaraldehyde (i.e., 1,5-pentanedial) was added to the mixed aqueous solution. The quantity of the added glutaraldehyde was 1 mol % of the vinyl alcohol unit. Then, 1N hydrochloric acid was added to the aqueous solution to make the pH of the aqueous solution to be about 2 to 3, and then the aqueous solution was allowed to stand for 24 hours or more. Thus, the hydrogel (semi-IPN gel) of SACRAN was produced.

Figure 8:
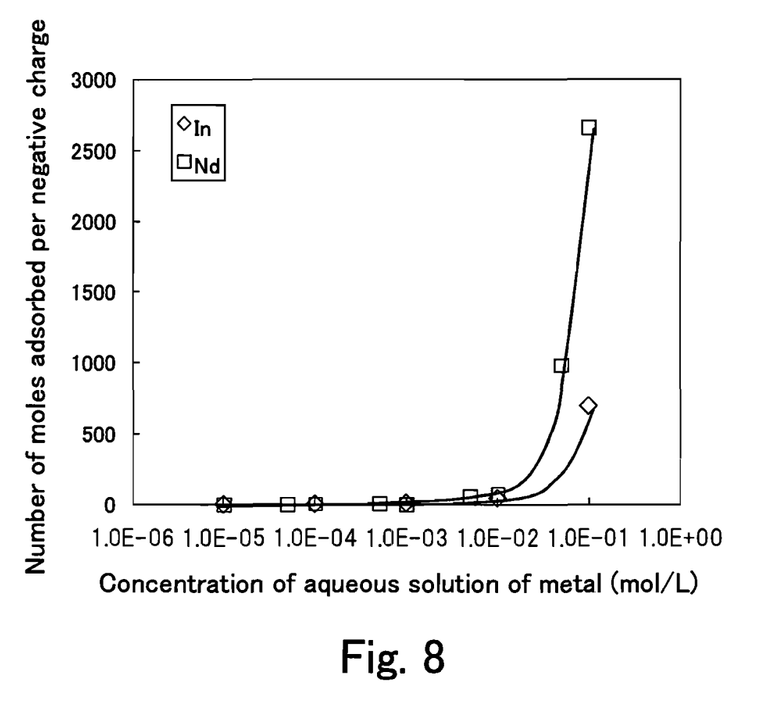
FIG. 8 is a graph showing the adsorption quantity of metal ions with regard to a semi-IPN gel of SACRAN.

The produced hydrogel was immersed in the aqueous solutions that were different in the concentration of the metal ion to measure the quantity of the metal ion to be adsorbed. The metal ion was neodymium ion ($Nd^{3+}$) or indium ion ($In^{3+}$). FIG. 8 shows the measurement results.

The vertical axis in FIG. 8 shows the number of moles of the metal ion that was adsorbed per 1 mol of negative charge. The semi-IPN gel achieved high adsorption efficiency compared to the hydrogel produced by crosslinking the carboxyl groups. The efficiency of adsorbing neodymium ion, which is a rare earth element, was higher than the efficiency of adsorbing indium ion. The semi-IPN gel can collect metal ions with the method and device of the present invention as well as the hydrogel produced by crosslinking the carboxyl groups. The reason why the semi-IPN adsorbed the metal ion with higher efficiency is not clear; however, it may be because the semi-IPN gel contains a larger number of the carboxyl group.

The embodiments of the present invention have been described with reference to specific examples; however, the present invention is not limited to the above-mentioned embodiments and can be applied to other embodiments according to the technical idea of the present invention.

For example, a method of reducing the metal ion with electrolysis has been described in Examples above. However, the metal ion may be reduced by adding a reducing agent to the adsorbent containing the polymer (P) that has adsorbed the metal ion (MI).

INDUSTRIAL APPLICABILITY

The present invention can be applied to the method and device for collecting metal ions, for example, the method and device for collecting metal ions in a solution. In another aspect, the present invention can be applied to the method and device for decreasing the concentration of a metal ion in a solution. The present invention makes it possible to collect specific metal selectively.

The invention claimed is:

1. A metal collection method comprising
(i) applying a voltage between a plurality of first electrodes and a second electrode so that each of the first electrodes serves as a cathode, with the first and second electrodes being placed in contact with an adsorbent, thereby depositing a metal on a surface of the first electrodes; and (ii) separating in turn the first electrodes, on which the metal has been deposited, from the adsorbent, then collecting the metal from the surface of the first electrodes, and then returning the first electrodes to the adsorbent, wherein the adsorbent comprises a macromolecule, the macromolecule contains the same constitutional units as those contained in a macromolecule extracted from Aphanothece sacrum, and the step (i) is conducted in a state in which a solution containing an ion of the metal is in contact with the adsorbent.

2. The metal collection method according to claim 1, wherein the adsorbent is a gel.

3. The metal collection method according to claim 1, further comprising directing the solution containing the ion of the metal through a flow path, and holding the adsorbent in a container, the container including a bottom surface in contact with the flow path that allows the adsorbent to adsorb the ion of the metal from the solution in the flow path.

4. A metal collection device comprising:
a container;
an adsorbent disposed in the container; and
a plurality of first electrodes and a second electrode, wherein
the first electrodes can be placed in contact with the adsorbent,
the adsorbent comprises a macromolecule that contains the same constitutional units as those contained in a macromolecule extracted from Aphanothece sacrum, and
the device further comprises a flow path through which a solution containing an ion of a metal flows, the flow path being connected to the container so that the solution comes into contact with the adsorbent.

5. The metal collection device according to claim 4, further comprising a power supply for applying a direct current voltage between the first electrodes and the second electrode.

6. The metal collection device according to claim 4, wherein the adsorbent is a gel.

7. The metal collection device according to claim 4, wherein the container includes a bottom surface in contact with the flow path that allows the adsorbent to adsorb the ion of the metal from the solution in the flow path.

* * * * *